(12) United States Patent
Wilsher

(10) Patent No.: US 8,253,993 B2
(45) Date of Patent: Aug. 28, 2012

(54) DUAL MIRROR ILLUMINATION SYSTEM FOR BOOK COPIER

(75) Inventor: Michael John Wilsher, Letchworth (GB)

(73) Assignee: Xerox Corporation, Norwalk, CT (US)

( * ) Notice: Subject to any disclaimer, the term of this patent is extended or adjusted under 35 U.S.C. 154(b) by 1169 days.

(21) Appl. No.: 12/034,017

(22) Filed: Feb. 20, 2008

(65) Prior Publication Data

US 2009/0207231 A1 Aug. 20, 2009

(51) Int. Cl.
*H04N 1/04* (2006.01)

(52) U.S. Cl. ........ 358/475; 358/497; 358/474; 358/483; 358/482

(58) Field of Classification Search ............ 358/475, 358/497, 494, 474, 483, 482, 509, 505, 512–514; 399/211, 212, 220, 221; 355/67, 68, 70, 355/71; 250/208.1, 239, 216, 234–236
See application file for complete search history.

(56) References Cited

U.S. PATENT DOCUMENTS

| | | | |
|---|---|---|---|
| 5,063,404 A * | 11/1991 | Milillo | 355/30 |
| 5,526,098 A | 6/1996 | Peck et al. | |
| 5,760,924 A * | 6/1998 | Takahara et al. | 358/474 |
| 6,975,949 B2 | 12/2005 | Mestha et al. | |
| 6,999,210 B2 * | 2/2006 | Uchida | 358/475 |
| 7,113,314 B2 | 9/2006 | Hayashi et al. | |
| 7,414,762 B2 * | 8/2008 | Poletto | 358/496 |
| 7,436,556 B2 * | 10/2008 | Onishi et al. | 358/484 |
| 7,538,915 B2 * | 5/2009 | Lee et al. | 358/497 |
| 7,751,098 B2 * | 7/2010 | Tseng | 358/484 |
| 2004/0164223 A1 | 8/2004 | Harris | |
| 2007/0134037 A1 | 6/2007 | Tse et al. | |

FOREIGN PATENT DOCUMENTS

| | | |
|---|---|---|
| EP | 0371765 A | 6/1990 |
| EP | 1059801 A | 12/2000 |

OTHER PUBLICATIONS

European Search Report and Search Opinion for European Patent Application No. 09152886.9, mailed on Jun. 25, 2009.
European Office Action issued in European Patent Application No. 09152886.9, mailed on Dec. 1, 2011.

* cited by examiner

*Primary Examiner* — Cheukfan Lee
(74) *Attorney, Agent, or Firm* — Pillsbury Winthrop Shaw Pittman LLP

(57) ABSTRACT

A scanner comprising a platen positioned along a first plane and configured to support an article to be scanned; one or more illuminators positioned below the platen along a second plane parallel to the first plane, and configured to emit light beams; one or more mirrors positioned between the platen and the one or more illuminators, each of the mirrors being configured to direct a light beam having a directional component parallel to the first and second planes emitted by the illuminators onto the article on the platen at the imaging point; one or more sensors configured to detect the light reflecting off the article at the imaging point along a sensor optical path; and a carriage mechanism constructed to affect relative movement parallel to the first and second planes between platen, and the one or more illuminators and the one or more mirrors in a scanning direction.

25 Claims, 4 Drawing Sheets

DUAL MIRROR ILLUMINATION SYSTEM FOR BOOK COPIER

FIELD

The present disclosure relates to a scanner for scanning an article, such as a book, supported on a platen. The scanner is used in an image processing apparatus, for example, such as a scanner, a copying machine, a facsimile, or a multi-function device.

BACKGROUND

A scanner 100, such as a CCD scanner as shown in FIG. 1, typically includes a lamp 107 and a reflector 108, a full rate carriage 103, and a half rate carriage 104 with mirrors that reflect via a lens 105 onto a sensor 106. During the scan, the full rate carriage 103 and the half rate carriage 104 are moved along a document to pick up the image information from the document. Light from the illuminator 107 is focused onto an imaging point 112 on a platen 102 and reflected off an article positioned on the platen 102 onto the sensor 106 via the imaging mirrors 109-111. The scanner 100 generally has an imaging limit as shown by plane A-A in FIG. 1, and does not scan or image right up to the edge of the scanner assembly. The imaging limit A-A is formed because it is difficult to arrange the full rate carriage 103 and the half rate carriage 104 such that the extreme left edge area of the original is properly seen and imaged onto the photosensitive surface.

Special book scanners are designed for scanning books, an example of which is shown at 200. In order to scan into the spine of a book 250 without opening the book fully and breaking the spine, book scanners 200 are generally derived from the scanner 100 by raising the platen 202 and providing sloped part 251 so that the book can be opened with the page being scanned relatively flat on the platen 202. This configuration provides for better imaging of the page area proximate the book spine. When the platen 202 is raised, as shown in FIG. 2, two optical changes are made to direct the light beams emitted by a lamp 207 to a new imaging point 212 on the raised platen 202. The first optical change is changing the focal position by modifying a sensor 206, a lens 205 and mirrors 209-211 configuration. The lamp 207, the reflector 208 and the mirror 209 are configured to move together on a full rate carriage 215. The mirrors 210 and 211 of the book copier 200 are provided on a half rate carriage 213, similarly to the scanner of FIG. 1. The second optical change is raising the illumination components up to the new height of the platen. Typically these optical changes are done by moving the lamp 207 and an associated reflector 208 in upward direction closer to the raised platen 202. Also, the book copier 200 needs additional hardware in order to raise the lamp 207 and the associated reflector 208 closer to the raised platen 202.

The current disclosure provides a scanner with a simple design that enables easy adaptation or modification of the existing image processing apparatus, without the need for repositioning the lamp and the reflector assembly.

SUMMARY

In an embodiment, a scanner is provided. The scanner includes a platen positioned along a first plane and configured to support an article to be scanned; one or more illuminators positioned below the platen along a second plane parallel to the first plane, and the one or more illuminators are configured to emit light beams; one or more mirrors positioned between the platen and the one or more illuminators and between the first and the second planes, each of the mirrors being configured to direct a light beam emitted by the illuminators onto the article on the platen at the imaging point; one or more sensors configured to detect the light reflecting off the article at the imaging point along a sensor optical path; and a carriage mechanism constructed to affect relative movement parallel to the first and second planes between the platen, and the one or more illuminators and the one or more mirrors in a scanning direction.

In another embodiment, a method for scanning an article supported on a platen positioned along a first plane is provided. The method includes positioning one or more illuminators below the platen along the second plane parallel to the first plane, the one or more illuminators being configured to emit light beams; positioning one or more mirrors between the platen and the one or more illuminators and between the first and the second planes, each of the mirrors being configured to direct a light beam emitted by the illuminators onto the article on the platen at a imaging point; configuring one or more sensors to detect the light reflecting off the imaging point at along a sensor optical path; and configuring a carriage mechanism to affect relative movement parallel to the first and second planes between (i) the platen and (ii) the one or more illuminators and the one or more mirrors in a scanning direction.

Other aspects, features, and advantages will become apparent from the following detailed description, and the accompanying drawings.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

Figure 3:
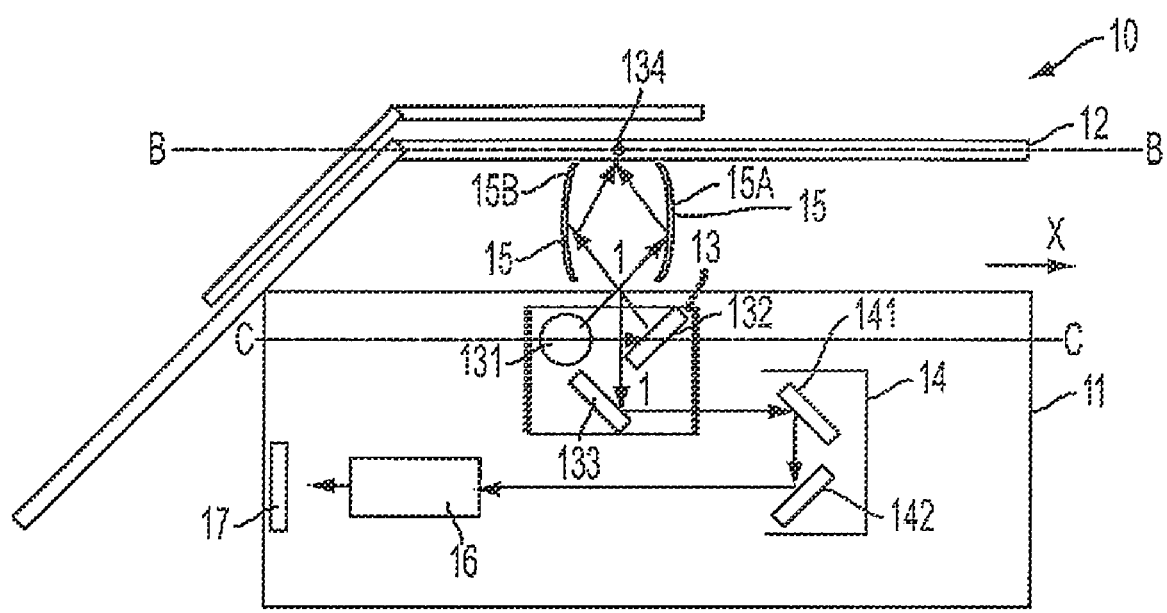
FIG. 3 is a schematic representation of a scanner used in an image reading apparatus with one or more mirrors positioned between the platen, and the lamp and reflector assembly.

FIG. 3 shows an exemplary embodiment of a scanner 10 that includes a platen 12, one or more illuminators 131, a carriage mechanism 13, one or more mirrors 15, and one or more sensors 17. In one embodiment, the scanner 10 is used in any image reading apparatus of an image processing apparatus, for example, such a copying machine, a facsimile, or a multi-function device. In one embodiment, the scanner 10 includes a housing 11, which encloses the one or more illuminators 131, a reflector 132, the one or more sensors 17, one or more imaging mirrors 133, 141 and 142, and one or more lenses 16.

The platen 12 is positioned in a first plane (marked B-B) and is configured to support an article to be scanned. In one embodiment, the platen 12 is formed of a transparent glass. In one embodiment, the article to be scanned, which is mounted on the platen 12 may include a sheet-type document or a book.

The illuminator 131 is positioned below the platen 12 along a second plane (marked C-C) parallel to the first plane. There may be a single illuminator 131 or multiple illuminators 131, and each is configured to emit light beams. In one embodiment, a fluorescent lamp with a longitudinal direction in a fast-scanning direction (a direction orthogonal to drawing sheet) is used as the illuminator 131. In another embodiment, the illuminator(s) 131 may be a linear LED array, a lamp with a reflector, or a collimated light source.

The mirrors 15 are positioned between the platen 12 and the illuminator 131 in the area between the first and second planes B-B and C-C. There may be just one mirror 15 or more than one, and the illustrated embodiment has two. The mirrors 15 are configured to direct the light beams, emitted by the illuminator 131, onto the imaging point 134 on the raised platen 12. In one embodiment, the mirrors 15 are configured to direct the light beams, including those received directly from the illuminator 131 and those, reflected off the reflector 132, onto the imaging point 134 on the platen 12. In one embodiment, the mirrors 15 may include a pair of curved (or parabolic) mirrors to direct the illumination to the higher platen imaging position. In an alternative embodiment, a pair of plane mirrors may be used in place of the pair of curved mirrors to direct the illumination to the higher platen imaging position. The curved mirrors further concentrate the light beams at the imaging point 134 on the platen 12, but depending on the amount of the light required the plane mirrors may be in sufficient to direct the illumination to the higher platen imaging position. The mirrors 15 are configured to be attached to the carriage mechanism 13 and to travel along with the carriage mechanism 13. In one embodiment, the mirrors 15 are fixed to the carriage mechanism 13 and move along with the carriage mechanism 13 as a single element. In one embodiment, the mirrors 15 are attached to the carriage mechanism 13 using screws. It should be appreciated, however, that this embodiment is but one example of different attaching means that can be provided. The exact positioning, size and angle of the one or more mirrors 15 is dependent on the individual imaging geometry.

The carriage mechanism 13 is constructed to affect relative movement parallel to the first and the second planes between the platen 12, and the illuminator 131 and the mirrors 15. The carriage mechanism 13, disposed below the platen 12, includes: the illuminator 131, the reflector 132, the mirrors 15 and a first imaging minor 133. In one embodiment, the carriage mechanism 13 is a full rate carriage that travels entire length of the platen 12.

The reflector 132 is spaced from the one or more illuminators 131 along the second plane. The reflector 132 is configured to reflect a portion of the light emitted from the one or more illuminators 131. In one embodiment, the one or more mirrors 15 includes a pair of mirrors, one of the pair 15A being configured to receive light directly from the one or more illuminators 131 and the other of the pair 15B being configured to receive light from the one or more illuminators 131 reflected off the reflector 132.

In one embodiment, the first imaging mirror 133 is configured to be positioned at an angle of 45° with respect to the first plane or the second plane. The first imaging mirror 133 is configured to change an optical path of the light reflecting off the article at an imaging point 134 in a direction parallel to the first plane or in a direction parallel to the second plane.

The one or more sensor(s) 17 may be a solid-state image sensor, a CMOS sensor or a CCD sensor.

In one embodiment, if the image reading apparatus supports monochrome images, one line sensor is formed on a semiconductor board (not shown). If the image reading apparatus supports color images, three line sensors corresponding to the three colors, R (red), G (green), and B (blue) are formed on the semiconductor board at prescribed intervals so that the three light components can be detected. If the image reading apparatus supports monochrome and color images, one line sensor for monochrome images and three line sensors for the R, G, and B colors are formed on the semiconductor board at prescribed intervals.

As discussed earlier, the scanner 10 includes the second carriage mechanism 14. The second carriage mechanism 14 includes second and third imaging mirrors 141 and 142 disposed to form a substantially right angle. In one embodiment, the second carriage mechanism 14 is a half rate carriage mechanism that is configured to travel half of the length of the platen 12. The second and the third imaging mirrors 141 and 142 successively changes optical paths of the light reflecting off the first imaging mirror 133 by 90 degrees at a time. The second imaging mirror 141 is configured to change the optical path of the light reflecting off the first imaging mirror 133 in a direction perpendicular to the first plane or the second plane. The third imaging mirror 142 is configured to change the optical path of the light reflecting off the second imaging mirror 141 in a direction parallel to the first plane or the second plane.

The carriage mechanism 13 and the second carriage mechanism 14, driven by e.g., a stepping motor (not shown in the drawing), either directly or via a wire/pulley or gear system, are configured to reciprocally travel in a slow-scanning direction, as indicated by the arrow X, and a direction opposite to it in conjunction with each other. As described above, in one embodiment, the carriage mechanism 13 and the second carriage mechanism 14 are configured to move in a direction substantially parallel to the first plane and the second plane.

The optical path length from the imaging point 134 located on the platen 12 to the sensor 17 is preferably kept at a constant length even though the carriage mechanism 13 and the second carriage mechanism 14 moves. The carriage mechanism 13 is configured to travel the entire length of the platen 12, while the second carriage mechanism 14 is configured to travel half of the length of the platen 12. Therefore, the second carriage mechanism or the half rate carriage 14 is generally moveable by half of the moving distance of the carriage mechanism or the full rate carriage 13. Other types of carriage mechanisms may be used.

The scanner 10 may include a read signal processing section (not shown) including a drive control section such as a driver for driving the sensor(s) 17. An analog video signal outputted from the sensor(s) 17, after being subjected to predetermined signal processing in the read signal processing section, is sent to the image processing section (not shown). The image processing section may be configured to take in account any angular dependence of the illuminator(s) and the sensor(s).

When reading an image of a document or a book, the document or the book is mounted on the platen 12 manually and fixed in an arbitrary position on the platen 12 so that the carriage mechanism 13, the one or more mirrors 15 and the second carriage mechanism 14 is moved for scanning at a constant speed to read the document image.

Specifically, the light beams from the illuminator(s) 131 are directed via the one or more mirrors 15, and are applied on the document surface through the platen 12. The light beams reflected from the imaging point 134 on the platen 12 is gathered on the imaging face of the sensor(s) 17 by the one or more lenses 16 after passing through the carriage mechanism 13 and the second carriage mechanism 14. The one or more sensor 17 perform photoelectric conversion for the incident light on a pixel basis to read the document image by a prescribed resolution determined by the number of pixels and outputs an analog image signal. If the image reading apparatus supports color images, analog image signals of the R, G, and B color components are outputted from the sensor(s) 17.

When reading an image of a document or a book, in order that irradiation light from the illuminator(s) 131, directed via the one or more mirrors 15, is applied on the whole surface of the document and the one or more sensors 17 read the whole input image through the readout optical system including the one or more lenses 16, the readout optical system including the carriage mechanism 13 including the light illuminator(s) 131, the second carriage mechanism 14, or the one or more lenses 16, and the sensor(s) 17 move at a constant speed in the direction (slow-scanning direction).

Figure 1:
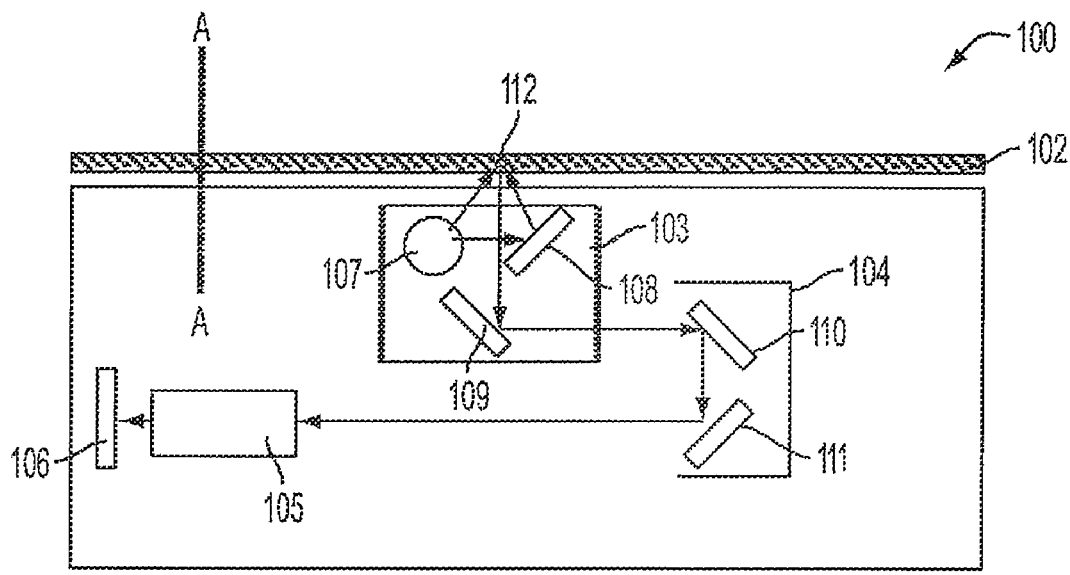
FIG. 1 is a schematic representation of a prior art scanner used in an image reading apparatus of an image processing apparatus.
Figure 2:
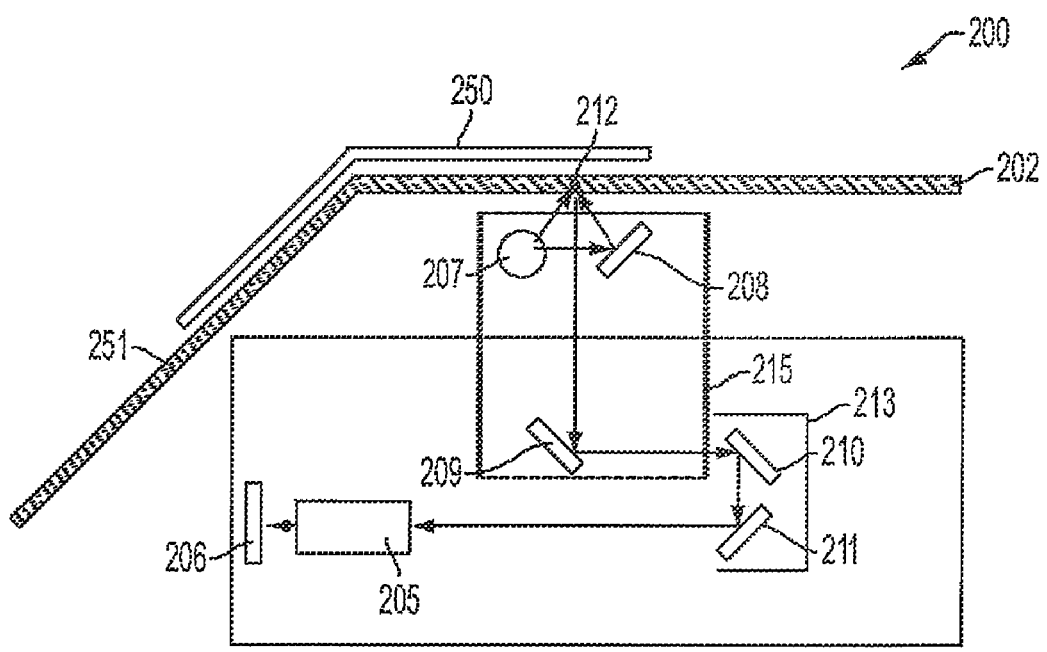
FIG. 2 is a schematic representation of a prior art scanner used in an image reading apparatus with a platen, and a lamp and reflector assembly in raised configuration.

Instead of moving the lamp 207 and the reflector 208 assembly to accommodate for the raised platen position, as shown in the prior art approach of FIG. 2, the present disclosure uses the same imaging components as the prior art system of FIG. 1, supplemented with an add-on optical assembly that allows the raised platen to be used. As discussed above, the add-on assembly includes the pair of mirrors 15 that direct the illumination from the normal platen position to a raised platen position. Therefore, the present disclosure provides the scanner 10 with simple design that enables easy adaptation or modification of the existing image processing apparatus (for example, such as a scanner, a copying machine, a facsimile, or a multi-function device) for use with a raised platen as a book scanner. Additionally, from a manufacturing and assembly standpoint, the systems of FIGS. 1 and 3 have more common components and require less adaptation, thus allowing for increased overall efficiency.

The dual mirror illumination scanner of the present disclosure provides other added advantages such as an improved length of travel, an improved depth of illumination and a reduction in the stray light due to spurious varying reflections.

The dual mirror illumination scanner 10 further concentrates the illumination in the imaging plane using one or mirrors 15 and thus, provides an improvement in depth of illumination in comparison with the raised lamp and reflector assembly shown in FIG. 2.

The dual mirror illumination scanner 10 also shields the part of the page or book not being imaged from stray light. Specifically, the pair of mirrors 15 act as an optical shield to reduce the extraneous light from the illuminating system getting to areas of the image which are not being actively scanned. Therefore, the imaging system of the dual mirror illumination system is less affected by any spurious varying reflections from the un-imaged document further improving image fidelity. The quality of the image is measured using a noise-to-signal ratio.

Figure 4:
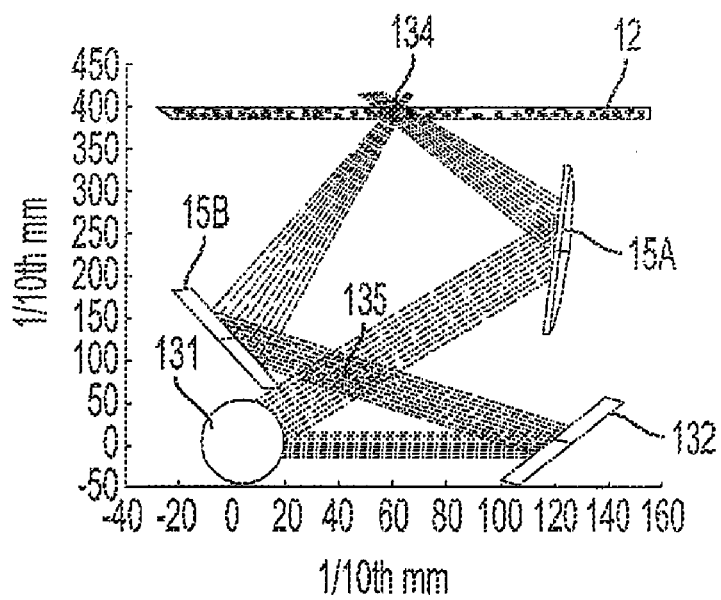
FIG. 4 shows a graph illustrating how the use of mirrors concentrates the light beams at a new imaging point on the raised platen.

FIG. 4 shows a graph that illustrates the use of curved mirrors to concentrate the light beams at an imaging point 134 on the platen 12. Graph illustrates the distance in $1/10^{th}$ of millimeter on a horizontal x-axis. On a vertical y-axis, the graph illustrates the distance in $1/10^{th}$ of millimeter. The one or more mirrors 15 includes a primary mirror 15A and a secondary mirror 15B. The primary mirror 15A is configured to accept the light beams emitted by the illuminator 131, while the secondary mirror 15B is configured to accept the reflected light beams from the reflector 132. In one embodiment, the primary mirror 15A and the secondary mirror 15B are curved mirrors. Both mirrors 15A and 15B are configured to concentrate the light beams to the new imaging point 134. An imaging point 135 shown in the graph is an old imaging point i.e., the imaging point when the platen 12 is not in a raised configuration. The exact positioning, size and angle of the mirrors is dependent on the individual imaging geometry. This configuration is shown in the diagram below (FIG. 4).

Figure 5:
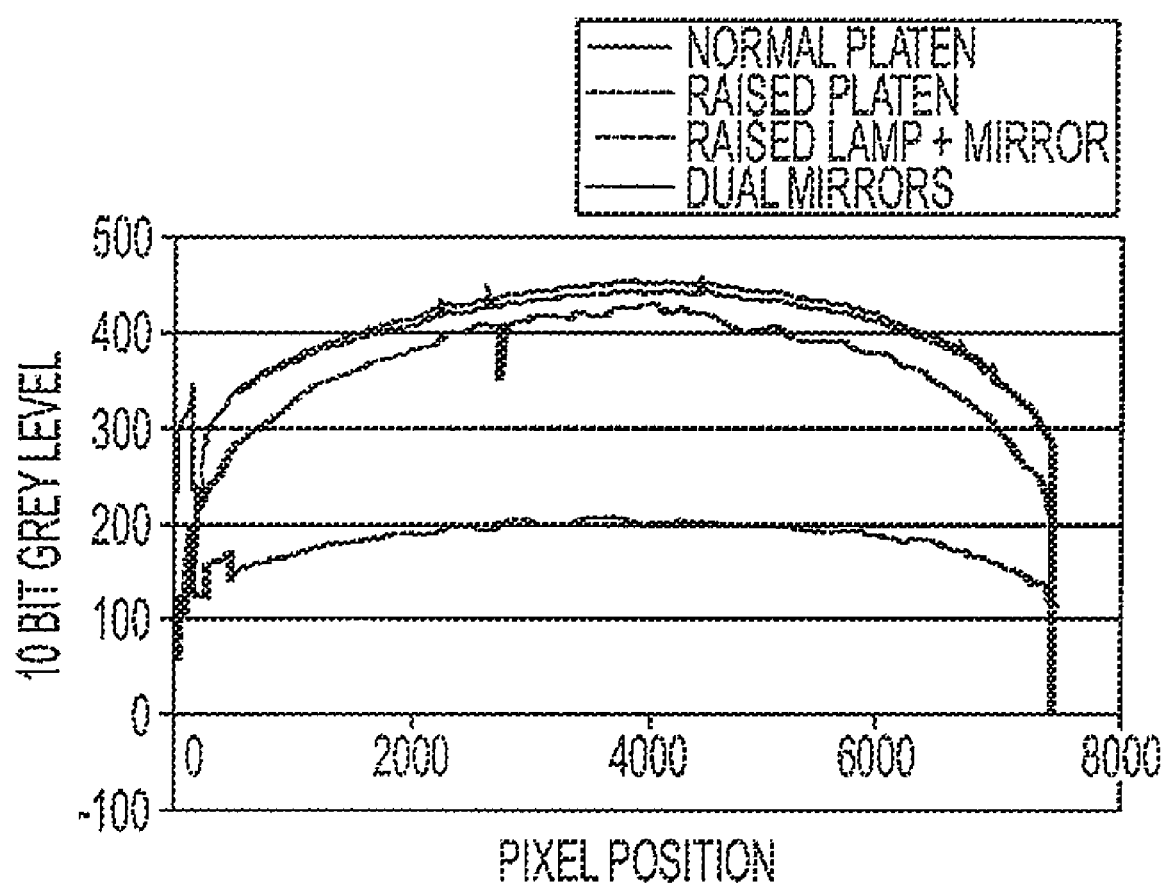
FIG. 5 shows illumination profiles measured from a scanner system, a raised platen scanner, a repositioned lamp and mirror assembly scanner and a dual mirror illumination scanner.

FIG. 5 shows a graph with illumination profiles measured from a scanner 100 (as shown in FIG. 1), a raised platen scanner, a repositioned lamp and mirror assembly scanner 200 (as shown in FIG. 2) and the dual mirror illumination scanner 10 (as shown in FIG. 3). Graph illustrates the pixel position on a horizontal x-axis. On a vertical y-axis, the graph illustrates the digitized illumination level in ten bit gray level. As can be seen from FIG. 5, when the platen is raised to a new position, as expected, the illumination level in the raised plate position falls significantly from the illumination level at the normal platen position. If the lamp and mirror assembly is raised along with the platen then the illumination level substantially returns to the illumination level at the normal platen position. If the dual mirror illumination system with one or mirrors 15 is used in the scanner 10, then the illumination level substantially returns to the illumination level at the normal platen position. (Note: The slight increased roll off at the edges with the dual mirror illumination scanner 10 is due to the fact that length of the mirrors 15 used to plot this graph was slightly shorter than required, but nevertheless this graph illustrates the enhanced performance). Therefore, from this graph, it can be clearly seen that the dual mirror illumination scanner 10 with the add-on mirrors 15 restores the illumination level to near the normal value.

Figure 6:
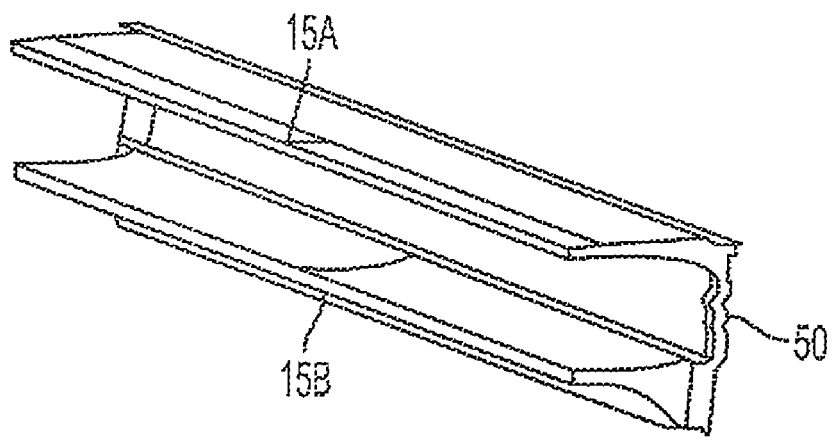
FIG. 6 is an illustration illustrating a scanner with an dual mirror optical assembly.

The dual mirror illumination system used in the scanner 10 is shown in FIG. 6. As discussed earlier, the pair of mirrors 15 include the primary mirror 15A and the secondary mirror 15B. The mirror assembly 15 can be attached to the scanner 10 by attaching the mirror assembly 15 on top of the carriage mechanism 13 by using any attachment mechanism, such as bolting, welding, or any other mechanical fastening, as would be appreciated by one skilled in the art.

Figure 7:
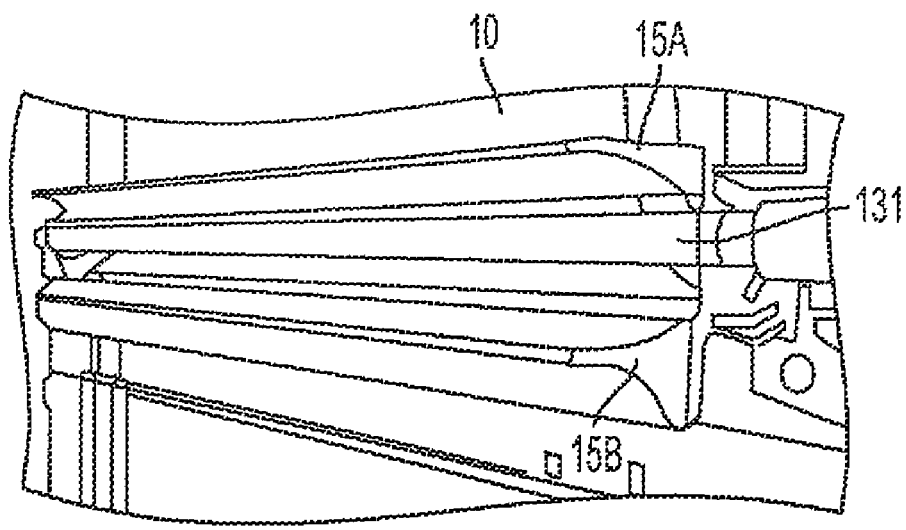
FIG. 7 is an illustration illustrating the dual mirror optical assembly.

FIG. 7 shows an exploded view of the pair of mirrors 15 used in the scanner 10. The mirrors 15A and 15B are connected to each other by a connecting member 50. In one embodiment, the mirrors 15A, 15B and the connecting member 50 are integrally formed. In another embodiment, the connecting member 50 and the mirrors 15A and 15B are attached using any attachment mechanism, such as welding, adhesives or mechanical fasteners, as would be appreciated by one skilled in the art. In the illustrated embodiment, the mirrors 15A and 15B are curved mirrors.

While the specific embodiments of the present disclosure have been described above, it will be appreciated that the disclosure may be practiced otherwise than described. The description is not intended to limit the disclosure.

I claim:

1. A scanner comprising:
   a platen positioned along a first plane and configured to support an article to be scanned;
   an illuminator assembly positioned below the platen along a second plane parallel to the first plane;
   at least two curved mirrors positioned between the platen and the illuminator assembly and between the first and second planes, the illuminator assembly comprising one or more illuminators and being configured to emit a light beam at each of the curved mirrors, and each of the curved mirrors being configured to concentrate and direct the light beam emitted at it by the illuminator assembly onto the article on the platen at an imaging point;

one or more sensors configured to detect the light reflecting off the article at the imaging point along a sensor optical path; and a carriage mechanism constructed to affect relative movement parallel to the first and second planes between
(i) the platen and
(ii) the illuminator assembly and the curved mirrors in a scanning direction, wherein the first plane is higher than the second plane.

2. The scanner of claim 1, further comprising one or more lenses placed in the sensor optical path to direct the light reflecting off the article at the imaging point to the sensor.

3. The scanner of claim 1, wherein the one or more illuminators of the illuminator assembly comprises an illuminator source and a reflector, the reflector being spaced from the illuminator source along the second plane and configured to reflect a portion of the light beams emitted from the illuminator source, wherein one of the curved mirrors being configured to receive light directly from the illuminator source and the other of the curved mirrors being configured to receive light from the illuminator source reflected off the reflector such that the curved mirrors concentrate and direct the received light at the imaging point from two sides to provide balanced illumination.

4. The scanner of claim 3, further comprising one or more imaging mirrors configured to change the optical path of the light reflecting off the article at the imaging point.

5. The scanner of claim 4, wherein the one or more imaging mirrors comprises a first imaging mirror, a second imaging mirror and a third imaging mirror.

6. The scanner of claim 5, wherein the first imaging mirror is configured to change the optical path of the light reflecting off the article at the imaging point in a direction parallel to the first plane or the second plane.

7. The scanner of claim 5, wherein the second and the third imaging mirrors form a right angle with each other so that the second imaging mirror is configured to change the optical path of the light reflecting off the first imaging mirror in a direction perpendicular to the first plane or the second plane and the third imaging mirror is configured to change the optical path of the light reflecting off the second imaging mirror in a direction parallel to the first plane or the second plane.

8. The scanner of claim 5, wherein the first imaging mirror, the illuminator assembly, and the curved mirrors are configured to be mounted on the carriage mechanism.

9. The scanner of claim 5, wherein the second imaging mirror, and the third imaging mirror are mounted on a second carriage mechanism, wherein the second carriage mechanism is configured to travel half of the distance traveled by the carriage mechanism.

10. The scanner of claim 1, wherein the sensor comprises at least one of the group consisting of: a CMOS sensor, and a CCD sensor.

11. The scanner of claim 1, wherein the illuminator source comprises at least one of the group consisting of: a linear LED array, a lamp, and a collimated light source.

12. The scanner of claim 1, wherein the curved mirrors are parabolic mirrors.

13. A method for scanning an article supported on a platen positioned along a first plane, the method comprising:

illuminating the article with an illuminator assembly positioned below the platen along a second plane parallel to the first plane;

positioning at least two curved mirrors between the platen and the illuminator assembly and between the first and second planes, the illuminator assembly comprising one or more illuminators and being configured to emit a light beam at each of the curved mirrors, and each of the curved mirrors being configured to concentrate and direct the light beam emitted at it by the illuminator assembly onto the article on the platen at an imaging point;

actuating a carriage mechanism to affect relative movement parallel to the first and second planes between
(i) the platen and
(ii) the illuminator assembly and the curved mirrors in a scanning direction; and sensing with one or more sensors the light reflecting off the imaging point at along a sensor optical path, wherein the first plane is higher than the second plane.

14. The method of claim 13, further comprising one or more lenses placed in the sensor optical path to direct the light reflecting off the article at the imaging point to the sensor.

15. The method of claim 13, wherein the one or more illuminators of the illuminator assembly comprises an illuminator source and reflector, the reflector being spaced from the illuminator source along the second plane and configured to reflect a portion of the light beams emitted from the illuminator source, one of the curved mirrors being configured to receive light directly from the illuminator source and the other of the curved mirrors being configured to receive light from the illuminator source reflected off the reflector such that the curved mirrors concentrate and direct the received light at the imaging point from two sides to provide balanced illumination.

16. The method of claim 15, further comprising one or more imaging mirrors configured to change the optical path of the light reflecting off the article at the imaging point.

17. The method of claim 16, wherein the one or more imaging mirrors comprises a first imaging mirror, a second imaging mirror and a third imaging mirror.

18. The method of claim 17, wherein the first imaging mirror is configured to change the optical path of the light reflecting off the article at the imaging point in a direction parallel to the first plane or the second plane.

19. The method of claim 17, wherein the second and the third imaging mirrors form a right angle with each other so that the second imaging mirror is configured to change the optical path of the light reflecting off the first imaging mirror in a direction perpendicular to the first plane or the second plane and the third imaging mirror is configured to change the optical path of the light reflecting off the second imaging mirror in a direction parallel to the first plane or the second plane.

20. The method of claim 17, wherein the first imaging mirror, the illuminator assembly, and the curved mirrors are configured to be mounted on the carriage mechanism.

21. The method of claim 17, wherein the second imaging mirror; and the third imaging mirror are mounted on a second carriage mechanism, wherein the second carriage mechanism is configured to travel half of the distance traveled by the carriage mechanism.

22. The method of claim 13, wherein the sensor comprises at least one of the group consisting of: a CMOS sensor, and a CCD sensor.

23. The method of claim 13, wherein the illuminator source comprises at least one of the group consisting of: a linear LED array, a lamp, and a collimated light source.

24. The method of claim 13, wherein the curved mirrors are parabolic mirrors.

25. A scanner comprising:
- a platen positioned along a first plane and configured to support an article to be scanned;
- an illuminator assembly positioned below the platen along a second plane parallel to the first plane and comprising an illuminator source and an illumination mirror and wherein the illumination mirror being spaced from the illuminator source along the second plane;
- a pair of curved mirrors positioned between the platen and the illuminator assembly and between the first and second planes, the illuminator source being configured to emit light beams at one of the pair of curved mirrors and the reflector and the reflector being configured to reflect the light beam emitted at it at the other of the pair of curved mirrors, each of the curved mirrors being configured to concentrate and direct the light beam emitted at it onto the article on the platen at an imaging point such that the curved mirrors concentrate and direct the received light at the imaging point from two sides to provide balanced illumination;
- one or more sensors configured to detect the light reflecting off the article at the imaging point along a sensor optical path; and
- a carriage mechanism constructed to affect relative movement parallel to the first and second planes between
  (i) the platen and
  (ii) the illuminator assembly and the curved mirrors in a scanning direction, wherein the first plane is higher than the second plane.

* * * * *